United States Patent
Dybro et al.

(10) Patent No.: US 9,578,808 B2
(45) Date of Patent: Feb. 28, 2017

(54) MULTI-SENSOR CROP YIELD DETERMINATION

(71) Applicants: Deere and Company, Moline, IL (US); Iowa State University Research Foundation, Inc., Ames, IA (US)

(72) Inventors: Niels Dybro, Sherrard, IL (US); Aaron J. Bruns, Bettendorf, IA (US); Matthew J. Darr, Ames, IA (US); Robert McNaull, Ames, IA (US)

(73) Assignees: Deere & Company, Moline, IL (US); Iowa State University Research Foundation, Inc., Ames, IA (US)

( * ) Notice: Subject to any disclaimer, the term of this patent is extended or adjusted under 35 U.S.C. 154(b) by 189 days.

(21) Appl. No.: 14/279,947

(22) Filed: May 16, 2014

(65) Prior Publication Data

US 2015/0327440 A1    Nov. 19, 2015

(51) Int. Cl.
| | |
|---|---|
| *G01L 1/00* | (2006.01) |
| *A01D 75/00* | (2006.01) |
| *G07C 5/08* | (2006.01) |
| *G01L 5/00* | (2006.01) |
| *A01D 41/127* | (2006.01) |
| *A01D 45/02* | (2006.01) |

(52) U.S. Cl.
CPC ......... *A01D 75/00* (2013.01); *A01D 41/1271* (2013.01); *A01D 45/021* (2013.01); *G01L 5/0052* (2013.01); *G07C 5/085* (2013.01)

(58) Field of Classification Search
CPC ......... A01D 75/00; G01L 5/0076; G01L 3/24; B60R 2021/01516

USPC ........ 73/862.541, 862.381, 862.49, 862.391, 73/862.041, 862

See application file for complete search history.

(56) References Cited

U.S. PATENT DOCUMENTS

| | | | | |
|---|---|---|---|---|
| 8,215,191 | B2 * | 7/2012 | Tragesser ............. | A01D 43/085 73/760 |
| 8,478,493 | B2 * | 7/2013 | Anderson .............. | G05D 1/024 37/348 |
| 2003/0172636 | A1 * | 9/2003 | Clauss ................. | A01D 43/085 56/10.2 R |
| 2004/0050138 | A1 * | 3/2004 | Beck ................... | G01F 25/0007 73/1.16 |
| 2009/0071714 | A1 * | 3/2009 | Shrestha .............. | A01C 21/002 175/20 |
| 2013/0152534 | A1 * | 6/2013 | Clark ................... | A01D 34/006 56/10.2 B |

(Continued)

OTHER PUBLICATIONS

Precision, Stalk sensor apparatus systems and methods,May 30, 2013, WO 2013078328.*
European Search Report for DP15163797 dated Oct. 5, 2015.

*Primary Examiner* — Lisa Caputo
*Assistant Examiner* — Nigel Plumb
(74) *Attorney, Agent, or Firm* — Rathe Lindenbaum LLP

(57) ABSTRACT

A crop yields sensing system comprises a first sensor of a first type associated with a portion of a harvester to output first signals facilitating determination of crop yield and a second sensor of a second type different than the first type to output second signals facilitating determination of crop yield for the portion of the harvester. The system further comprises a processing unit to receive the first signals and the second signals and determine crop yield for the portion of the harvester based on a combination of the first signals and the second signals.

20 Claims, 10 Drawing Sheets

(56) References Cited

U.S. PATENT DOCUMENTS

2014/0174199 A1\* 6/2014 Strnad ................ A01D 41/1272
                                                                               73/861.73
2014/0331631 A1\* 11/2014 Sauder ................. A01D 45/021
                                                                               56/10.2 R \* cited by examiner

MULTI-SENSOR CROP YIELD DETERMINATION

CROSS-REFERENCE TO RELATED PATENT APPLICATIONS

The present application is related to co-pending U.S. patent application Ser. No. 14/184668 filed on Feb. 19, 2014 and entitled STRIPPER PLATE ADJUSTMENT, the full disclosure of which is hereby incorporated by reference. The present application is related to co-pending U.S. patent application Ser. No. 13/771682 filed on Feb. 20, 2013 and entitled CROP SENSING, the full disclosure of which is hereby incorporated by reference. The present application is related to co-pending U.S. patent application Ser. No. 13/771727 filed on Feb. 20, 2013 and entitled PER PLANT CROP SENSING RESOLUTION, the full disclosure of which is hereby incorporated by reference. The present application is related to co-pending U.S. patent application Ser. No. 13/771760 filed on Feb. 20, 2013 and entitled CROP SENSING DISPLAY, the full disclosure of which is hereby incorporated by reference. The present application is related to co-pending U.S. patent application Ser. No. 13/771795 filed on Feb. 20, 2013 and entitled SOIL COMPACTION REDUCTION SYSTEM AND METHOD, the full disclosure of which is hereby incorporated by reference.

BACKGROUND

Crop harvesting machines, such as combines, sometimes include crop throughput sensors. Such sensors detect the ongoing crop yield of the swath of the harvesting machine. The information produced from such sensors may be inadequate for the ever-increasing sophistication of crop management.

DETAILED DESCRIPTION OF THE EXAMPLE EMBODIMENTS

Figure 1:
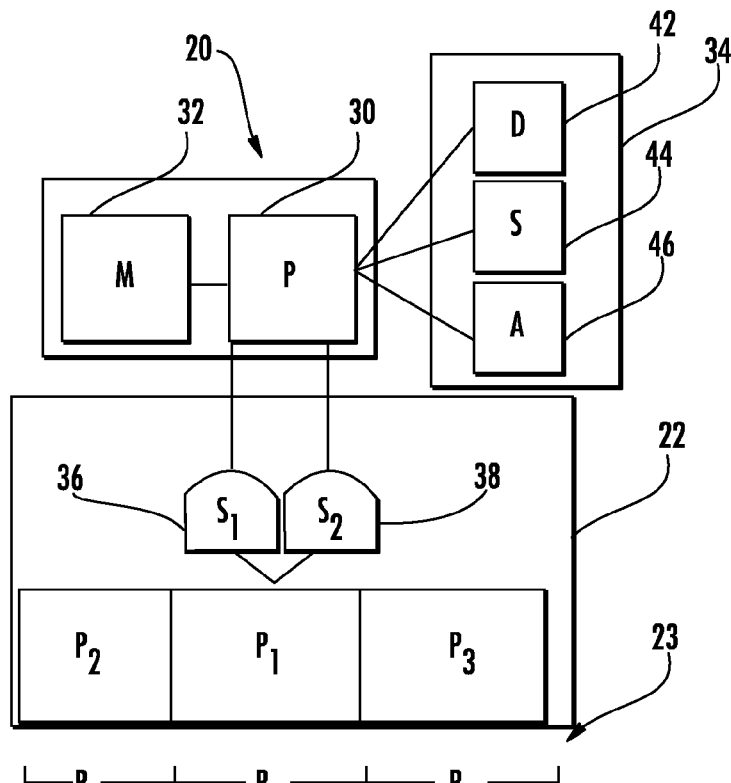
FIG. 1 is a schematic diagram of an example crop yield sensing system.

FIG. 1 schematically illustrates an example crop yield sensing system 20. Crop yield sensing system 20 outputs crop data and field maps with an enhanced resolution. In an example embodiment, the term "resolution" refers to the level of detail with regard to crop data and/or field maps. Resolution for crop data or field maps may be determined by the smallest unit for which an attribute is sensed or for which an attribute is derived. Generally, the smaller the unit, the greater the resolution. Crop yield sensing system 20 outputs crop data and maps a field using sensed or derived attributes and/or identified conditions for individual units or portions of the field having a width less than a utilized crop harvesting width of a harvester. For example, even though a harvester may have a harvesting swath of 12 rows, crop yield sensing system 20 may output crop data or field maps providing crop attributes such as, yield, for less than 12 rows, such as on a row-by-row basis or even a plant-by-plant basis. Crop yield sensing system 20 may be similarly implemented with respect to non-row crops and non-row harvesters. The greater crop data resolution provided by crop yield sensing system 20 facilitates more advanced and sophisticated crop management.

Crop yield sensing system 20 comprises harvester 22, processor 30, memory 32 and output 34. Harvester 22 comprises an agricultural machine configured to collect, gather or harvest crops. Harvester 22 gathers or harvests such crops along an area or swath 23 comprising portions P1, P2 and P3. Each portion of harvester 22 harvests the crops from a distinct region of a field. In one implementation, portions P1, P2 and P3 of harvester 22 comprise individual row units to harvest individual crop rows. In another implementation, portions P1, P2 and P3 of harvester 22 comprise groups or subsets of individual row units. In some implementations, the crops are not grown in rows, wherein each portion of harvester 22 harvests a distinct area of the crops along the swath 23 of harvester 22.

Harvester 22 comprises a plurality of sensors assigned to each of one or more individual portions of the harvesting swath. In the example illustrated, harvester 22 comprises sensor 36 and sensor 38 located so as to cooperate with one another to determine crop yield from the example portion P1 of harvester 22. Although sensors 36, 38 are illustrated as being assigned to a central portion P1 of the swath 23 of harvester 22, in other implementations, sensor 36, 38 may alternatively be assigned to other portions, such as portion P2 and/or portion P3. In other implementations, each of such portions may be assigned a pair of sensors to facilitate yield determinations for the particular individual portions of swath 23. Although harvester 22 is illustrated as including three of such portions, in other implementations, swath 23 of harvester 22 may be partitioned into a greater or fewer of such portions, wherein one or more of such portions is assigned a plurality of sensors that cooperate to determine crop yield for each individual portion. In some implementations, such portions may share sensors.

Sensors 36, 38 comprise different types of sensors sensing different events, stimulus and/or crop attributes. Because sensors 36, 38 detect different events, stimulus and/or crop attributes, the determination of crop yield for the particular portion to which sensors 36, 38 are assigned may be more reliable and accurate.

As will be described hereafter, in one implementation, the different signals from sensor 36, 38 are both utilized to determine or estimate crop yield for the particular portion of swath 23. In one implementation, signals from sensor 38 are utilized to adjust a crop yield estimate for the associated portion of swath 23 to compensate for yield determining inadequacies of sensor 36. In one implementation, sensor 36 comprises a sensor associated with a stripper plate of portion P1 while sensor 38 comprises an acoustic sensor associated with portion P1. In other implementations, sensor 36, 38 may comprise other distinct forms of sensors.

Processor 30 comprises at least one processing unit in communication with sensors 36, 38 to receive signals from sensors 36, 38 and, following instructions contained in memory 32, determine or estimate a crop yield for the portion of swath 23 associated with sensors 36, 38. Processor 30 is further configured to generate output 34 for the determined or estimated crop yield for the particular portion. In an example embodiment, the term "processing unit" means a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, processor 30 may be embodied as part of one or more application-specific integrated circuits (ASICs). Unless otherwise specifically noted, the controller is not limited to any specific combination of hardware circuitry and software, nor to any particular source for the instructions executed by the processing unit.

In one implementation, processor 30 and memory 32 form a controller which is incorporated as part of harvester 22. In yet another implementation, processor 30 and memory 32 are remotely located with respect to harvester 22, wherein harvester 22 communicates with processor 30 and transmits signals from sensor 36, 38 in a wireless fashion to processor 30. In still other implementations, processor 30 and memory 32 are provided as part of a portable electronic computing device which is configured to be temporarily connected to sensors 36, 38 of harvester 22 during harvesting.

Output 34 is generated by processor 30 in response to a determination of a crop yield for a particular portion of harvester 22. Output 34 comprises the display of the determined crop yield, the storage of the determined crop yield and/or an adjustment of an operating characteristic of harvester 22. In the example illustrated, to facilitate such output 34, system 20 comprises display 42, data storage 44 and actuator 46 (each of which is schematically shown). Display 42 comprises a monitor, display screen or the like by which an operator of harvester 22, manager or other person is presented with data regarding the current or ongoing crop yield from the particular portion of swath 23 or a cumulative crop yield for the particular portion of swath 23. In one implementation, display 42 comprises a touch screen, serving as an input for entering data, selections or commands. In one implementation, display 42 is carried by harvester 22. In yet another implementation, display 42 is located remote with respect to harvester 22.

Data storage 44 comprises a persistent storage device or non-transitory computer-readable medium upon which results or data derived from the signals received from sensors 36, 38 regarding crop yield is stored. In one implementation, data storage 44 is provided as part of the non-transitory memory 32. In one implementation, data storage 44 is local, carried by harvester 22. In yet another implementation, data storage 44 is remote from harvester 22, such as where data storage 44 is provided at a remote server facility.

Actuator 46 comprises one or more mechanisms which adjust operational characteristics of harvester 22 in response to control signals from processor 30 which are based upon the determined or estimated crop yield for a particular portion of swath 23 of harvester 22. In one implementation, actuator 46 adjusts individual operating characteristic of the particular portion of swath 23 of harvester 22. For example, in response to determining an increase in crop yield for a particular portion, such as portion P1, processor 30 generates signals causing actuator 46 to adjust at least one operational characteristic of the portion of harvester 22 that is harvesting the portion P1. In another implementation, actuator 46 adjusts the operational characteristics of the entire swath 23 or multiple portions of swath 23. For example, in one implementation, processor 30 adds the estimated crop yield rate from multiple portions to estimate a crop yield rate for the entire swath 23 and generates control signals based upon such estimates or determinations so as to cause actuator 46 to adjust the operational characteristics of harvester 22 across the entire swath 23. In another implementation, processor 30 estimates the current ongoing crop yield rate for the entire swath 23 based upon the estimated crop yield rate for one or more particular portions of swath 23, wherein processor 30 generates control signals based upon such estimates or determinations so as to cause actuator 46 to adjust the operational characteristics of harvester 22 across the entire swath 23.

Figure 2:
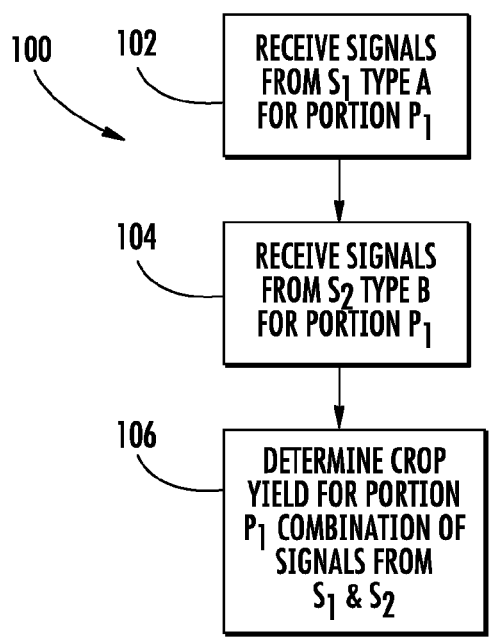
FIG. 2 is a flow diagram of an example method for estimating crop yield.

FIG. 2 is a flow diagram of an example method 100 for being carried out by system 20. Method 100 is embodied as code or circuitry in a non-transitory computer-readable medium forming memory 32. As indicated by block 102, processor 30 receives signals from sensor 36 for the particular portion P1 to which sensor 36 is assigned. As noted above, sensor 36 is of a first type ("Type A") to output signals in response to a first stimulus. In one implementation, sensor 36 senses force, such as the force produced from the impact of crop, such as an ear of corn, against harvester 22. In one implementation, processor 30, following instructions contained in memory 32, periodically polls sensor 36. In yet another implementation, sensor 36 streams data signals to processor 30.

As indicated by block 104, processor 30 further receives signals from sensor 38 for the same particular portion P1 to which sensor 38 is assigned. As noted above, sensor 38 is of a second type ("Type B") different than Type A, outputting signals in response to a second stimulus different than the first stimulus. In one implementation, sensor 38 comprises an acoustic sensor that senses sound resulting from the crop impacting harvester 22. In one implementation, processor 30, following instructions contained in memory 32, polls sensor 38. In yet another implementation, sensor 38 streams data to processor 30.

As indicated by block 106, processor 30 determines/estimates crop yield for the particular portion P1 of the harvester based upon a combination of the signals received from sensors 36 and 38. In one implementation, processor 30 individually analyzes different signals from the different sensors and utilizes a combination of the individual results from the individual sensors to determine or estimate crop yield for the particular portion P1. In another implementation, processor 30 estimates crop yield for the particular portion P1 based upon a combination of differently weighted signals and/or results derived from such signals from the different sensors 36, 38. For example, in one implementation, the estimated crop yield for portion P1 is calculated using a combination of signals, wherein the signals or results derived from such signals from sensor 38 are weighted differently as compared to the signals or results derived from the signals from sensor 36. In yet another implementation, processor 30 estimates the crop yield for portion P1 based upon signals from sensor 36, but in instances adjusts the crop yield based upon signals from sensor 38. For example, in one implementation, processor 30 utilizes signals from sensor 38 to confirm results based solely upon signals from sensor 36. For example, sensor 36 may fail to output signals indicating a crop yielding event. In such a circumstance, processor 30 utilizes signals from sensor 38 to confirm that a crop yielding event did not take place. In one implementation, signals from sensor 38 trigger the retrieval of data by processor 30 to supplant or supplement yield calculations.

Figure 3:
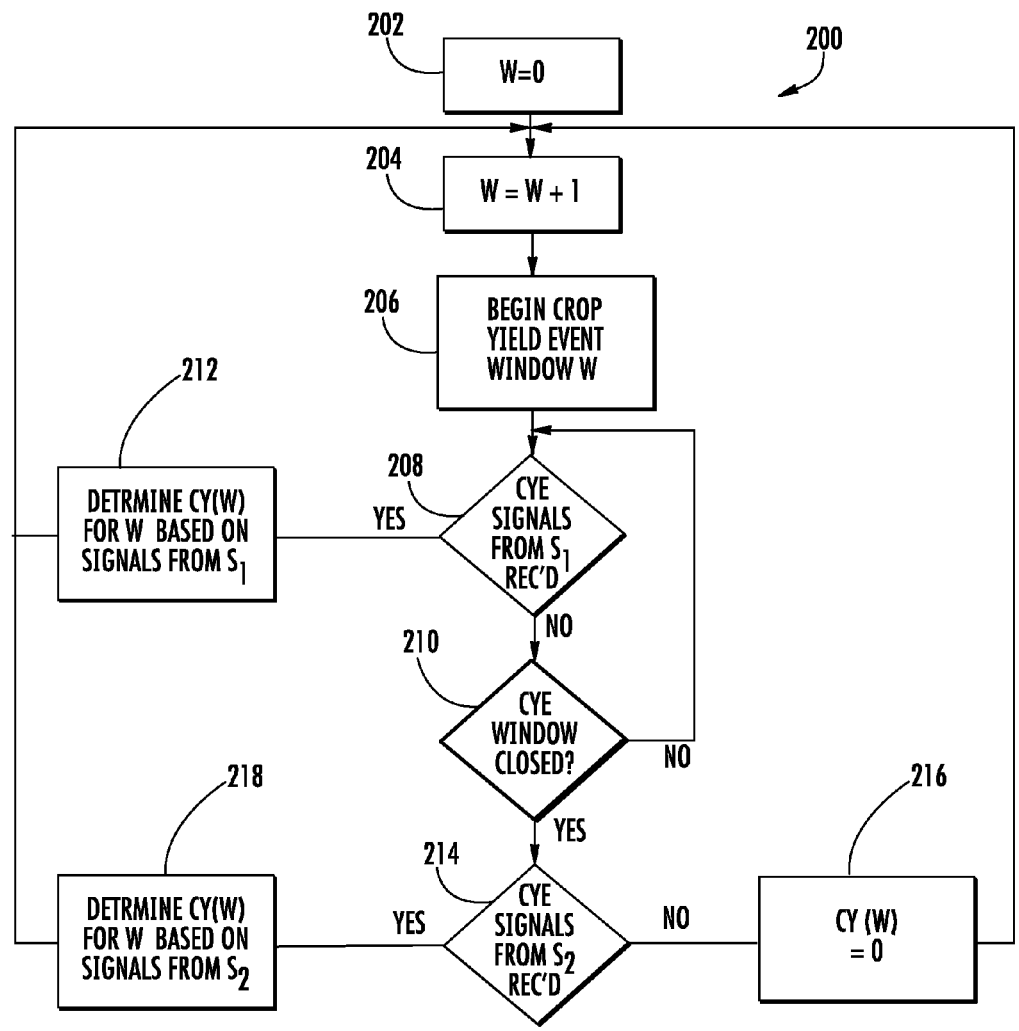
FIG. 3 is a flow diagram of another example method for estimating crop yield.

FIG. 3 is a flow diagram of an example method 200 that may be carried out by processor 30 for determining crop yield based upon a combination of signals. As with method 100, method 200 is embodied as code or circuitry in a non-transitory computer-readable medium forming memory 32. As indicated by block 202, a crop yield event window W is initialized at a value of zero. As indicated by block 204, the crop yield event window W is incremented by one. The variable W identifies the particular crop yield event window. This variable may comprise any alphanumeric symbol or character for distinguishing between different windows.

As indicated by block 206, the particular crop yield event window W begins. In an example embodiment, a crop yield event window is a predetermined period of time during which a crop yielding event is expected to take place. Such a window is defined in terms of time and/or is defined in terms of distance traveled by harvester 22. In one implementation, such a window is based upon the spacing between individual plants, such as a planting density. In one implementation, the absence of crop yielding event signals during the window may indicate a barren plant, a down, damaged or dead plant, or a missed planting.

As indicated by blocks 208 and 210, during each crop yield event window W, processor 30 determines whether crop yielding event signals from sensor 36 have been received. As indicated by block 212, upon receipt of such crop yielding event signals from sensor 36, processor 30 determines a crop yield CY(w) for the particular window based upon the signals from sensor 36 and proceeds with the next crop yield event window W through the incrementing of the window identifier W in block 204. However, as indicated by block 214, if no crop yielding event signals are received from sensor 36 during the particular crop yield event window W, processor 30 determines whether crop yielding event signals have been received from sensor 38 during the particular window W.

As indicated by block 216, if no crop yielding event signals have been received from sensor 38 during the particular just completed window W, processor 30 concludes that the crop yield event window W had no yield. In one implementation, processor 30 may store the zero yield for the particular window W, corresponding to a particular region of a field or row. As noted above, such zero yield may result from a barren plant, the down, dead or injured plant or a missed planting. By storing the zero yield for the particular window W, processor 30 facilitates the display, storage or presentation of maps of barren regions of a field versus productive regions of the field for use in later crop management decisions.

As indicated by block 218, if crop yielding event signals have been received from sensor 38 during the just completed window W, processor 30 adjusts the crop yield for the particular crop yield event window W based upon the crop yield event signals from sensor 38. Processor 30 determines a crop yield for the particular window W using the signals from sensor 38. After such an adjustment to the crop yield for the particular crop yield event window W is completed, processor 30 proceeds with the next crop yield event window W through the incrementing of the window identifier W in block 204.

Figure 4A:
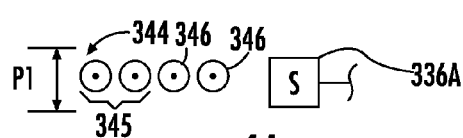
FIG. 4A is a schematic diagram illustrating harvesting and sensing of plants an an individual portion of the crop yield sensing system of FIG. 4.
Figure 4:
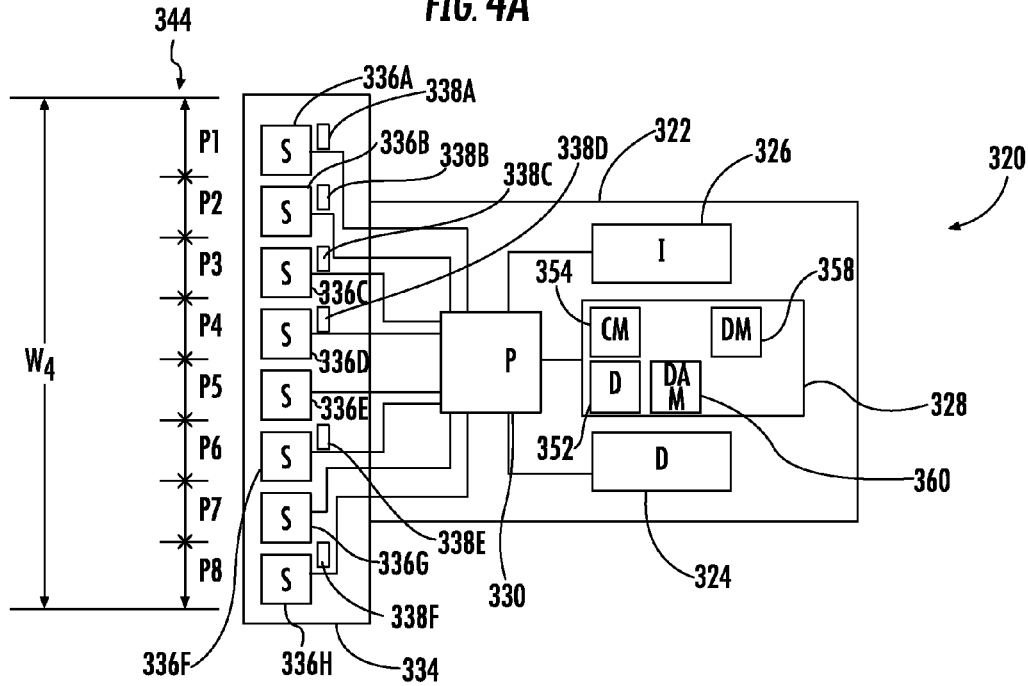
FIG. 4 is a schematic diagram of another example crop yield sensing system.

FIG. 4 schematically illustrates crop yield sensing system 320, a particular implementation of crop yield sensing system 20. Crop sensing system 320 comprises an agricultural machine, an example of which is the illustrated harvester 322. Crop sensing system 20 further comprises display 324, input 326, processor 330 and memory 328. Harvester 322 comprises a mobile machine configured to travel across a field or plot of land while harvesting a crop. Harvester 322 comprises head 334, sensors 336A-336H (collectively referred to as sensors 336) and sensors 338A-338F (collectively referred to as sensors 338).

Head 334 comprises a mechanism configured to gather and harvest a crop along a swath. The swath of head 334 has a utilized width, Wu, when harvesting crops. In an example embodiment, the utilized width Wu constitutes that portion of the length or swath width that is being utilized to harvest crops at a particular time. Although in most instances, the utilized width Wu is equal to the physical length of the swath of head 34, in some circumstances, the utilized width Wu may constitute only a portion of the swath of head 34, such as along an end row, waterway and/or the like. Head 334 includes various mechanisms for harvesting, such as mechanisms to sever or separate the crop from a remainder of a plant. Such mechanisms may include knives or blades, stripper plates, rollers, snapping roles, augers, gathering chains or belts and/or the like. In one implementation, head 334 comprises a corn head for a combine, wherein the corn head separates ears of corn from the remaining stalk. In another implementation, head 334 comprises a head having stripper plates or other mechanisms to sever other types of ears from associated stalks. In one implementation, the term "ear" refers to a seed-bearing part of a plant, such as ears of corn, seed laden flowers such as sunflowers, pods and the like. In another implementation, head 334 may comprise a crop head for a combine, wherein the grain along with the stalk is severed and subsequently threshed by the combine. In other implementations, head 334 may have other configurations. For example, although head 334 is illustrated as being located at a forward end of harvester 322 and as being interchangeable with other heads (facilitating the change of corn and grain heads), in other implementations, head 334 may be supported at other locations by harvester 322 and/or may be a permanent, non-interchangeable component of harvester 322.

Sensors 336 comprise mechanisms to sense or detect one or more crop attribute values for a crop of forage plants. In one example embodiment, a forage plant comprises a poacea family or grass plant, a fabaceae family or legume plant and/or a forb plant, but excludes trees such as coniferous and deciduous trees. Examples of poaceae plants or grass plants comprise corn, rice, wheat, barley, millet, oats, sugarcane, sorghum, rye and bamboo. Examples of fabacea plants or legume plants comprise beans such as soybeans. An example of a forb comprises a sunflower plant. Sensors 336 detect one or more crop attribute values for the forage plants along the entire swath of head 334 or a portion of swath or harvesting width of head 334. In one example embodiment, sensors 36 are located and carried by head 334. In one example embodiment, sensors 336 are provided in each row harvesting portion of head 334. In other implementations, sensor 336 may be provided at other locations.

Each of sensors 336 senses one more crop attribute values for crops harvested by a corresponding distinct portion of the utilized width Wu. Sensors 36 collectively detect multiple non-zero crop attribute values for a plurality of distinct portions of the utilized width Wu. Said another way, each of sensors 336 senses only a portion of the total crop being harvested at any moment in time by head 334, wherein each of sensors 336 provide crop attribute values for just that portion. For example, in one embodiment, each of sensors 336 may sense a crop attribute for plants along an individual row, providing "per row" crop attributes.

For example, as shown by FIG. 4, in one circumstance, the entirety of head 334 may be receiving and harvesting crops such that the utilized width Wu of head 334 is substantially equal to the physical width or swath of head 334. Sensors 336 each detect a less than whole portion or a fraction of the crop being harvested by the utilized width Wu. As indicated by partitioning 344, the utilized width Wu is partitioned or divided into 8 equal portions P1-P8, wherein sensors 336A-336H each provide a distinct crop attribute value for crops received from portions P1-P8, respectively. Although head 334 is illustrated as including eight row units with a corresponding eight sensors, in other implementations, head 334 may include a greater or fewer number of such row units and sensors along the physical width or swath of head 334. For example, a crop row harvester may have greater than or less than eight rows, wherein the head of the harvester may similarly divide with greater than or less than eight row sensing sensors. Although head 334 is illustrated as being partitioned into equal portions, in other example embodiments, head 334 is partitioned into unequal portions, wherein sensors 336 sense crop attributes for the unequal portions. For example, in another implementation, one of sensors 336 senses or detects crop attributes for an individual row while another sensor 336 senses crop attributes for a plurality of rows.

As shown by FIG. 4A, in some implementations, each of sensors 336 may offer an even higher degree of crop sensing resolution by being configured to detect crop attribute values for the individual plants 346 themselves. In some implementations, the sensed crop attribute values for individual plants 346 may be aggregated into sets or collections 345 of plants based upon time, distance, a number of plants, and/or the like to reduce the amount of data that is processed or stored. Aggregating individual plant data may also improve usability of the data by eliminating noise in the data. The sensed crop attribute values for the individual plants 346 comprise values which are independent of, or do not merely comprise the presence or location of the plant. Such crop attribute values for the individual plants 346 do not merely comprise data regarding the population of plants or the spacing of plants. Instead, each of sensors 336 may be configured to specifically sense other attributes of the individual plant such that crop attribute values pertaining to estimated mass of the grain or product of the individual plant, the estimated mass other than grain (MOG) of the plant and/or the like may be derived.

In one implementation, each of sensors 336 senses an interaction or impact force of grain upon a portion of the head 334, such as a stripper plate of head 334, wherein a mass of the grain may be derived based upon the sensed impact force and other sensed or known values. In another implementation, sensors 336 detect a stalk thickness/diameter of an individual plant. The stalk thickness/diameter of the individual plant may be detected either through physical contact with individual plant or through laser or optical and camera-based sensors. The mass of the grain or the MOG may be derived from the sensed stalk thickness/diameter. Other examples of sensors 336 include, but are not limited to for example, light detection and ranging (LIDAR or LADAR), structured light or stereo camera vision, strain gauges, and/or accelerometers (where crop impact is sensed), and/or the like.

Sensors 338 comprise sensors of a different type as compared to sensors 336, outputting signals in response to a stimulus different than the stimulus being sensed by sensors 336. In one implementation, while sensors 336 sense the force resulting from the impact of a crop with a portion of header 334, sensors 338 sense sound resulting from the crop impacting head 334 of harvester 322. In one implementation, processor 330, following instructions contained in memory 328, polls sensor 338. In yet another implementation, sensor 338 streams data to processor 330.

FIG. 4 illustrates two alternative arrangements for sensors 338. In the example illustrated, each of portions P1-P4 has a dedicated sensor 338. As a result, each portion or each row unit of head 334 harvesting portions P1-P4 has both an assigned sensor 336 and an assigned sensor 338. In the example illustrated, each of portions P5-P8 shares a sensor 338. In the example illustrated, sensor 338E is supported by head 334 between sensors 336E and 336F to produce crop yielding event signals when crop yielding events take place in either portion P5 or portion P6. Likewise, sensor 338F is supported by head 334 between sensors 336G and 336H to produce crop yielding event signals when crop yielding events take place in either portions P7 or P8. In other implementations, each of portions P1-P8 may have a dedicated sensor 338 or, alternatively, each adjacent pair of portions P1-P8 may share a sensor 338.

Display 324 comprises a device by which information may be visually presented to an operator of harvester 322 or to a remotely located monitor/manager/operator of harvester 322. Display 324 may comprise a monitor or screen which is stationary in nature or which is mobile in nature. In one implementation, display 324 is carried by harvester 322 along with the operator. In another implementation, display 324 comprises a stationary monitor remote from harvester 322. In yet other implementations, display 324 is mobile in nature, being provided as part of a computer tablet, smart phone, personal data assistant (PDA) and/or the like.

Input 326 comprises one or more devices by which controls and input may be provided to processor 328. Examples of input 326 include, but are not limited to, a keyboard, a touchpad, a touch screen, a steering wheel or steering control, a joystick, a microphone with associated speech recognition software and/or the like. Input 326 facilitates the input of selections, commands or controls. In implementations where harvester 322 is remotely controlled or remotely steered, input 326 may facilitate such remote steering.

Memory 328 comprises a non-transitory computer-readable medium or persistent storage device for storing data for use by processor 330 or generated by processor 330. In one implementation, memory 328 may additionally store instructions in the form of code or software for processor 330. The instructions may be loaded in a random access memory (RAM) for execution by processor 330 from a read only memory (ROM), a mass storage device, or some other persistent storage. In other embodiments, hard wired circuitry may be used in place of or in combination with software instructions to implement the functions described. For example, at least regions of memory 328 and processor 330 may be embodied as part of one or more application-specific integrated circuits (ASICs). In one implementation, memory 328 is carried by harvester 322. In other implementations, memory 328 may be provided remote from harvester 322.

In the example illustrated, memory 328 comprises data storage portion 352, correlation module 354, display module 358 and operations adjustment module 360. Data storage portion 352 contains historical data, such as lookup tables, facilitating analysis of data and information sensed by sensors 336. Data storage portion 352 is further configured to store the crop attribute values directly sensed by sensors 336, crop attribute values derived from the directly sensed crop attribute values using correlation module 354, crop or field conditions identified based upon the directly sensed crop attribute values and/or the derived crop attribute values. Such stored information may be in various formats such as tables, field maps and/or the like. Data storage portion 352 may additionally store various settings and operator preferences.

Correlation module 354, display module 358 and operations adjustment module 360 comprise programming, software or code for directing the operation of processor 330. Correlation module 354 instructs processor 330 in the correlation of one or more directly sensed crop attribute values detected by sensors 336 and/or sensors 338 to derived crop attribute values. In other words, correlation module 354 instructs processor 330 and the derivation of crop attribute values, such as yield and/or the like, from directly sensed crop attribute values. In one implementation, correlation module 354 directs processor 330 to consult a lookup table in data storage portion 352 to correlate a stalk thickness/diameter as detected by sensors 336 to a grain mass or grain yield value, the derived crop attribute value. In another implementation, correlation module 354 directs processor 330 to carry out one or more algorithms/mathematical equations using a sensed impact of a plant or grain, and possibly using other additional factors, to derive a grain mass or yield of the plant. In other implementations, correlation module 354 directs processor 330 to derived crop attribute values from directly sensed crop attribute values in other fashions.

Display module 358 instructs processor 330 to generate control signals causing display 324 to present various information and/or prompts to an operator. For example, display module 358 may cause processor 330 to prompt an operator to select whether or not and how individual plant data is to be aggregated, how data is to be displayed (graph, chart, field map), where such data is to be stored and/or the like. Display module 358 further instructs processor 330 in the display of data per operator preferences.

Operations adjustment module 360 comprises code or programming which directs processor 330 to automatically generate control signals adjusting operational parameters of harvester 322 based upon directly sensed or derived crop attribute values. In one implementation, operations adjustment module 360 generates control signals independently adjusting operational parameters of distinct portions of head 334 along its utilized width Wu. For example, operations adjustment module 360 may adjust the operational parameters of one row unit of head 334 independent of or differently with respect to another row unit of head 334 based upon directly sensed or derived crop attribute values for the crops being presently harvested by the different row units. For example, operations adjustment module 360 may, automatically in response to sensed or derived crop attribute values for crops harvested by a particular row unit, generate control signals for an actuator coupled to stripper plates of the row unit to adjust the spacing of stripper plates. This adjustment of stripper plates for the particular row unit may be independent of and different from the spacing adjustment of other stripper plates for other row units. As a result, the enhanced crop sensing resolution provides enhanced more refined control over the operation of harvester 322 to better harvest crops.

Processor 330 comprises one or more processing units configured to carry out instructions either hardwired as part of an application-specific integrated circuit or provided as code or software stored in memory 328. In the example illustrated, display 324, input 326, memory 328 and processor 330 are each illustrated as being part of and carried by harvester 322. In other implementations, one or more of such components may alternatively be located remote from harvester 322 and in communication with harvester 322 in a wireless fashion. In some implementations, some of the aforementioned functions of processor 330 in memory 328 may be shared amongst multiple processors or processing units and multiple memories/databases, wherein at least some of the processors and memories/databases may be located remote with respect to harvester 322.

System 320 is operable in a fashion similar to system 20. In one implementation, system 320 operates in accordance with method 100 described above with respect to FIG. 2. In one implementation, system 320 operates in accordance with method 200 described above with respect to FIG. 3. In each of such methods, processor 330, following instructions in correlation module 354, utilizes the combination of signals from sensor's 336 and 338 to determine crop yield. Based upon the estimated ongoing and such are cumulative crop yield for a particular portion or a particular group of portions of harvesting head 334, processor 330 generates output signals. In one implementation or mode of operation, processor 330, following instructions contained in display module 358, outputs or displays the current and/or ongoing yield for each of the portions of header 334 on display 324. In one implementation or mode, processor 330 further stores the current and/or ongoing yield results or estimates for each of the portions of harvesting had 334 in memory 328 and/or a remote memory. In one implementation or mode, processor 330, following instructions contained in operations adjustment module 360, outputs control signals which adjust one or more operational parameters of harvester 322.

Figure 5:
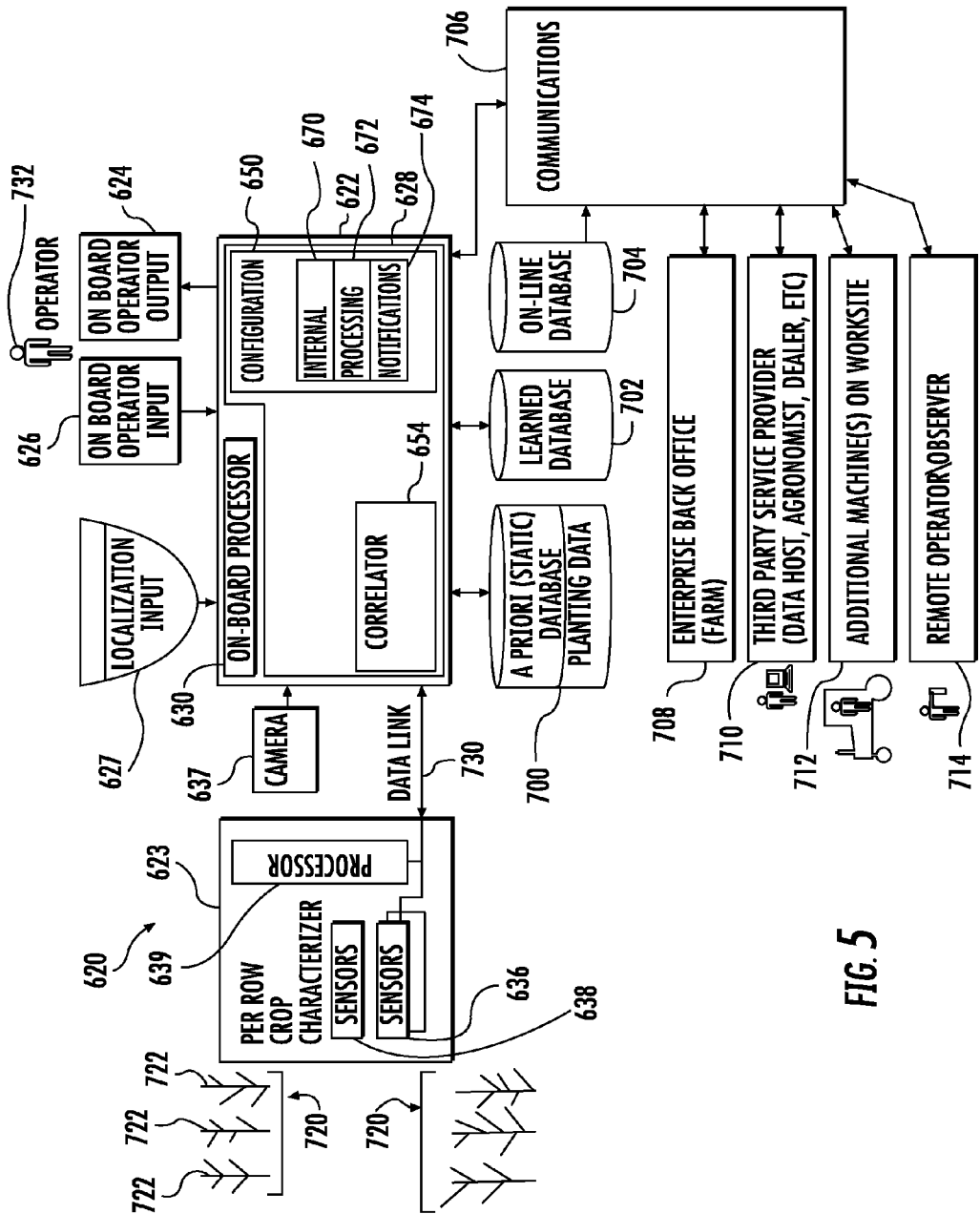
FIG. 5 is a schematic diagram of another example implementation of the crop yield sensing system of FIG. 1.

FIG. 5 schematically illustrates crop sensing system 620, an example implementation of crop sensing system 20. Crop sensing system 620 comprises crop characterizer 623, on-board operator output 624, on-board operator input 626, localization input 627, memory 628, on-board processor 630, static database 700, learned database 702, online database 704, communications 706, enterprise back office 708, third-party service providers 710, other on-site machines 712 and remote operators/observers 714.

Crop characterizer 623 comprises a device configured to sense or detect multiple non-zero crop attribute values for a plurality of distinct portions of the utilized width of a harvesting machine. In the example described, crop characterizer 623 detects crop attributes or crop characteristics on at least a row-by-row basis. Individual row of crops 720 are independently sensed and different attribute values may be identified and stored for the individual rows. In the example described, crop characterizer 623 detects crop attributes on a plant-by-plant basis. Individual plants 722 are independently sensed and different attribute values may be identified and stored for the individual plants or for a predefined aggregation of individual plants along a row 720 (for example, an aggregation based upon time, distance or plant count as described above). As a result, crop characterizer 623 facilitates data gathering and field maps having an enhanced resolution for more sophisticated analysis and crop management. In one example, crop attributes are defined by crop characterizing 623 on both a plant-by-plant basis and a row-by-row basis. In another example, crop attributes are defined for a selected one of the plant-by-plant basis or the row-by-row basis.

Crop characterizer 623 comprises sensors 636, sensors 638 and one or more cameras 637. Sensors 636 are similar to sensors 36 described above. Sensors 636 comprise mechanisms to concurrently sense or detect one or more crop attribute values for multiple portions of a utilized crop harvesting width of the harvester. Said another way, each of sensors 636 senses only a portion of the total crop being harvested at any moment in time by the harvester 622, wherein each of sensors 636 provide crop attribute values for just that portion. As noted above, in one implementation, sensors 636 provide crop attribute values on a row-by-row basis. In another implementation, sensors 636 provide crop attribute values on a plant-by-plant basis. Such crop attribute values for the individual plants 722 do not merely comprise of data regarding the population of plants or the spacing of plants. Each of sensors 636 may be configured to specifically sense other attributes of the individual plant such that crop attribute values pertaining to estimated mass of the grain or product of the individual plant, the estimated mass other than grain (MOG) of the plant and/or the like may be derived.

For example, in one implementation, each of sensors 636 senses an interaction or impact force of grain upon a portion of the harvester, such as a stripper plate. A mass of the grain may be derived based upon the sensed impact force. In another implementation, sensors 636 detect a stalk thickness/diameter of an individual plant either through physical contact with individual plant or through non-physical contact mechanisms such as laser or optical and camera-based sensors). The mass of the grain or the MOG may be derived from the sensed stalk thickness/diameter. Examples of sensors 636 include, but are not limited to, light detection and ranging (LIDAR or LADAR), structured light or stereo camera vision, strain gauges and/or accelerometers (where crop impact is sensed).

Sensors 638 are similar to sensors 38 and 338 described above. Sensors 638 are of a different type as compared to sensors 636 so as to output signals in response to sensing different stimuli as compared to sensors 636. The signals output by sensors 638 are utilized in combination with the signals produced by sensors 636 by processor 639 to estimate a crop yield for a particular portion or row of the harvester as described above with respect to method 100 or method 200. In one implementation, sensors 638 comprise acoustic sensors to sense noise produced by the impact of a crop with a portion of the harvester as it is being harvested.

In one implementation, camera 637 comprises an optical capture device carried by the harvester 622 to capture one or more rows 720 just prior to the harvesting of such rows 720. In one implementation, camera 637 captures images that are used to detect or determine one or more crop attributes or crop characteristics on a row-by-row basis or a plant-by-plant basis. In one implementation, camera 637 employee stereo vision or LIDAR for such detection. In one implementation, camera 637 captures images of the crop prior to harvesting, wherein the individual images or portions of video are linked to the crop attribute values detected by sensors 636. These values may be stored. The captured images or video are linked and indexed in a time-based manner or location-based manner to particular regions, individual rows or individual plants for which data is detected by sensors 636. As a result, when reviewing directly sensed crop attribute values (as detected by sensors 636) or derived crop attribute values for a particular region of a field, a particular set of rows of the field or a particular grouping of plants in the field, the operator may also retrieve and view images or videos of the actual region of the field, the particular rows of the field or the particular plants of the field corresponding to the data being viewed in a chart or map. Thus, system 620 allows an operator/monitor to visibly review the actual crops to either identify one or more conditions that may have affected the crop attribute such as yield or allows the operator/monitor to visibly confirm the crop/field condition identified by processor 630 as a reason for a particular crop yield or other attribute. For example, based upon data from sensors 636, 638, processor 630 may output a conclusion that a drop in yield was caused by a wet spot in the field. Camera 637 permits the operator to pull up (from memory) actual stored video images of the particular portion of the field to confirm whether indeed the particular rows were in a wet spot.

In the example illustrated, system 620 offers several modes of operations for characterizer 623. In one mode, sensors 636 and/or sensors 638 may be employed for crop characterization. In another mode, camera 637 may be employed for crop characterization. In yet another mode, both sensors 636, 638 and camera 637 may be utilized for crop characterization.

In some implementations, crop characterizer 623 may additionally comprise a local processor 639. Processor 639 receives signals from sensors 636 and conditions such signals prior to their transmission to on-board processor 630 via data link 730. For example, in some implementations, processor 639 derives other crop attribute values from the signals prior to their transmission to processor 630. Processor 639 may filter such signals to reduce noise prior to transmission by link 730. In some implementations, processor 639 may trim data or compress data prior to transmitting such data across link 730 to processor 630 to reduce transmission and/or processing loads. In another implementation, processor 639 may be omitted.

On-board operator output 624 comprises one or more devices carried by harvester 622 by which information and data may be presented to an onboard operator of harvester 622. Output 624 may comprise a display comprising a monitor or screen with or without a speaker. On-board operator input 626 comprises one or more devices carried by harvester 622 by which selections and/or data may be input, entered and provided by a local operator 32 riding or operating harvester 622. Examples of input 626 include, but are not limited to, a keyboard, a touchpad, a touch screen, a steering wheel or steering control, a joystick, a microphone with associated speech recognition software and/or the like. In one implementation, input 626 may be provided as part of output 624 in the form of a touchscreen.

Localization input 627 comprises an input to processor 630 which provides geo-data to processor 630. In other words, input 627 provides location or positional information to processor 630. For example, in one implementation, localization input 627 may comprise a global positioning system (GPS) receiver. In other examples, other geo-data sources may be utilized.

Memory 628 comprises a non-transitory computer-readable medium or persistent storage device for storing data for use by processor 630 or generated by processor 630. In one implementation, memory 628 may additionally store instructions in the form of code or software for processor 630. The instructions may be loaded in a random access memory (RAM) for execution by processor 630 from a read only memory (ROM), a mass storage device, or some other persistent storage. In other embodiments, hard wired circuitry may be used in place of or in combination with software instructions to implement the functions described. For example, at least regions of memory 628 and processor 630 may be embodied as part of one or more application-specific integrated circuits (ASICs). In the example illustrated, memory 628 is carried by harvester 622. In other implementations, memory 628 may be provided remote from harvester 622.

In the example illustrated, memory 628 comprises configuration module 650 and correlation module 654. Configuration module 650 comprises software code and associated stored data regarding the configuration of system 620. In the example illustrated, configuration module 650 includes sub-modules which direct processor 630 to prompt for selections from an operator, to store such selections and to operate according to such various selections. The stored selections control how processor 630 handles and analyzes data from characterizer 623 and how data or information is presented on output 624. In the example illustrated, configuration module 650 comprises interval sub-module 670, processing sub-module 672 and notification sub-module 674 which cooperate to present a display screen presenting crop yield information. Interval sub-module 670 prompts for and stores operator input regarding how individual plants are to be aggregated. Processing sub-module 672 prompts for and stores operator input regarding how such data is to be processed, for example, using statistical values such as average, median or range. Notification sub-module 674 prompts for and stores display settings.

Correlation module 654 comprises programming, software or code for directing the operation of processor 630. Correlation module 654 instructs processor 630 in the correlation of one or more directly sensed crop attribute values detected by sensors 636, 638 to derived crop attribute values. In other words, correlation module 654 instructs processor 630 and the derivation of crop attribute values, such as yield and/or the like, from directly sensed crop attribute values or possibly along with other factors or inputs. In one implementation, correlation module 654 directs processor 630 to consult a lookup table in a database to correlate a stalk thickness/diameter as detected by sensors 636 to a grain mass or grain yield value, the derived crop attribute value,. In another implementation, correlation module 654 directs processor 630 to carry out one or more algorithms/mathematical equations based upon a sensed impact of a plant or grain to derive a grain mass or yield of the plant. In other implementations, correlation module 654 may direct processor 630 to derived crop attribute values from directly sensed crop attribute values in other fashions.

Static database 700 comprises a data storage containing data regarding historical or predefined data such as historical planting data, historical yield information, historical field or soil data (e.g., topography, soil type). Static database 700 may additionally contain tables and other information for correlating sensed crop attribute values to derived crop attribute values. Learned database 702 comprises a data storage containing data that varies as harvester 622 travels across the field. Database 702 stores the raw directly sensed crop attribute values from sensors 636, 638 and/or camera 637, camera captured video or images, derived crop attribute values, and varying or adjustable harvester operational parameters, for example, harvester velocity, head height, and other harvester settings. In one example, database 702 further stores GPS data.

In the example illustrated, static database 700 and learned database 702 comprise databases that are part of memory 628 on board harvester 622. In other implementations, such databases 700, 702 may be remote from harvester 622 and may be accessed through communication 706. Online database 704 comprises a database that is accessed through a wide area network or a local area network using communication 706. Online database 704 may contain additional information for use by processor 630 and harvester 622. Communication 706 comprises a communication network facilitating communication between harvester 622 and remote entities such as online database 704, office 708, service provider 710, other on-site machines 712 and remote operator/observer 714.

Enterprise back office 708 comprises a location remote from harvester 622 such as the home farm. Enterprise back office 708 may include computing devices and a database, wherein processor 630 transmits data stored in learned database 702 to office 708 through communication 706 for backup and/or remote analysis. Third-party service provider 710 comprises a server in communication with harvester 622 through communications 706 and associated with a third-party such as an agronomist, a seed dealer, a seed company, a chemical, insecticide or fertilize supplier or third-party data storage host.

As indicated by FIG. 5, other harvesters or other machines on a particular worksite or field may also be in communication with harvester 622 through communications 706. As a result, sensed crop data may be shared amongst such multiple machines on a particular field or worksite. In some implementations, harvester 622 may communicate with the remote operator/observer 714 through communications 706. As a result, harvester 622 may be remotely controlled (the steering of harvester 622 and/or the adjustment of settings for the operation of crop sensing by harvester 622).

Figure 6:
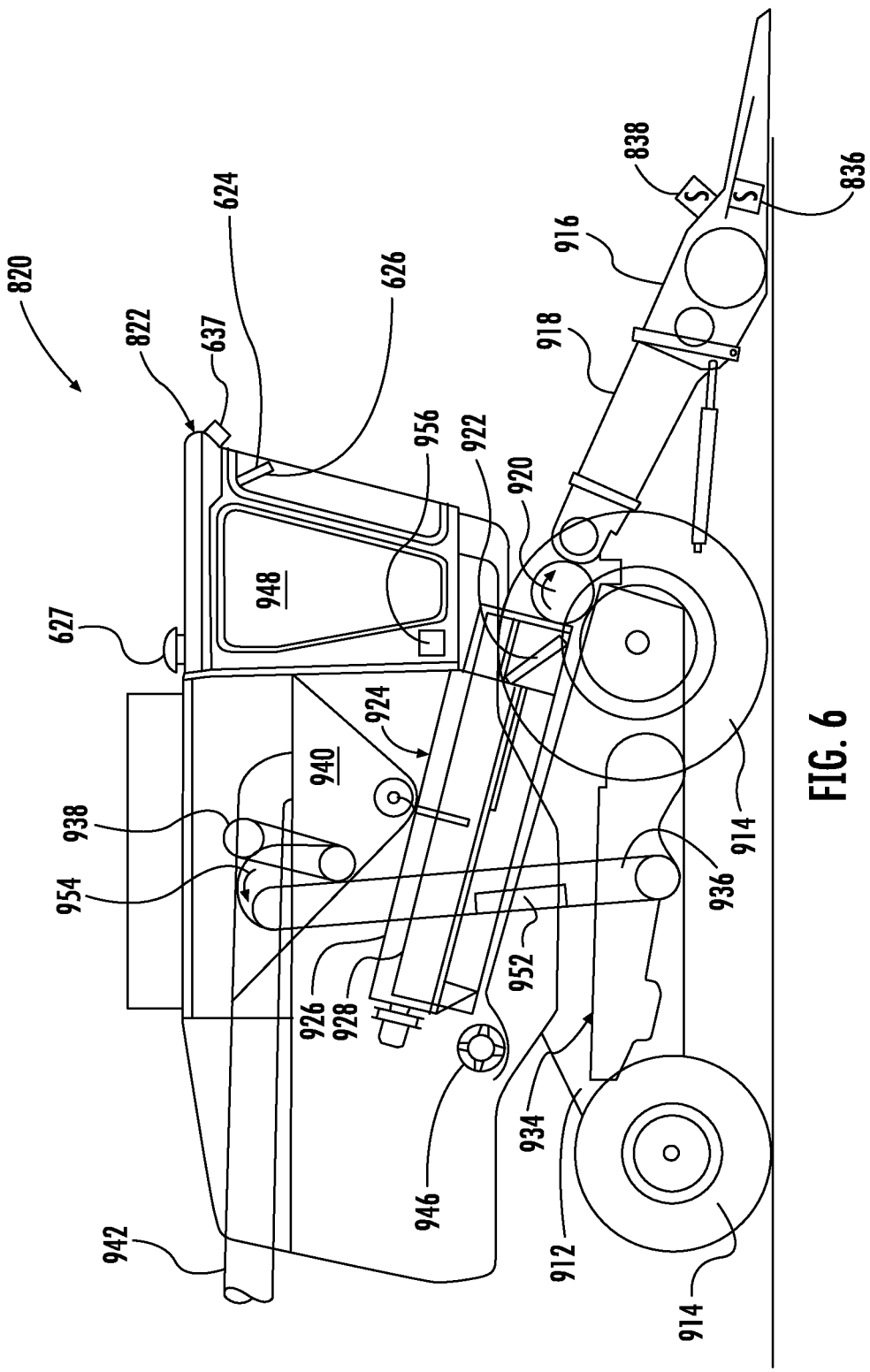
FIG. 6 is a side elevational view of another example crop yield sensing system comprising the crop yield sensing system of FIG. 5.
Figure 7:
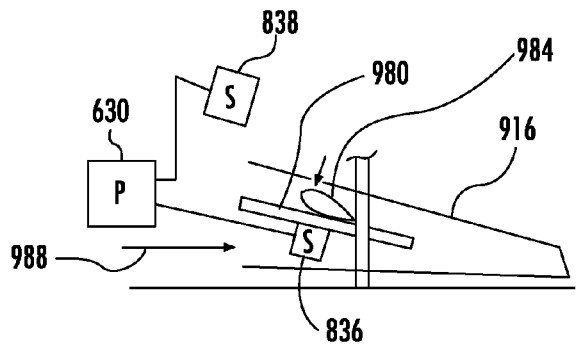
FIG. 7 is a schematic illustration illustrating crop yield sensing by the system of FIG. 6.

FIGS. 6 and 7 illustrate crop yield sensing system 820, an example of crop yield sensing system 20 or an example of crop yield sensing system 620. In the example illustrated, crop yield sensing system 820 comprises a harvester 822 (in the form of a combine). Crop yield sensing system 820 comprises each of the components illustrated and described with respect to FIG. 5, some of which are shown and similarly numbered in FIG. 6, except that crop sensing system 820 specifically includes sensors 836 and 838, particular examples of sensors 636 and 638, respectively.

Harvester 822 comprises a chassis 912 which is supported and propelled by ground engaging wheels 914. Although harvester 822 is illustrated as being supported and propelled on ground engaging wheels 914 it can also be supported and propelled by full tracks or half-tracks. A harvesting assembly 916 (shown as a corn head) is used to take up crop and to conduct it to a feeder house 918. The crop is conducted by the feeder house 918 to a beater 920. The beater 920 guides the crop upwardly through an intake transition region 922 to a rotary threshing and separating assembly 924. Although harvester 822 is described as a rotary combine, in other implementations, harvester 822 may comprise other types of combines (for example combines having a transverse threshing cylinder and straw walkers or combines having a transverse threshing cylinder and rotary separator rotors) or other agricultural harvesting machines including, without limitation, self-propelled forage harvesters, sugar cane harvesters, and windrowers The rotary threshing and separating assembly 924 comprises a rotor housing 926 and a rotor 928 arranged in the rotor housing 926. The harvested crop enters the rotor housing 926 through the intake transition region 922. The rotary threshing and separating assembly 924 threshes and separates the harvested crop. Grain and chaff fall through grates at the bottom of the rotor housing onto a cleaning assembly 934. The cleaning assembly 934 removes the chaff and conducts the clean grain to a grain elevator 936 which conducts upwardly to a distributing screw conveyor 938. The distributing screw conveyor 938 deposits the clean grain in a grain tank 940. The clean grain in the grain tank 940 can be unloaded through an unloading auger 942 into a trailer or truck. Threshed straw separated from the grain is conducted out of the rotary threshing and separating assembly 924 through an outlet to a discharge beater 946. The discharge beater 946 ejects the straw out the rear of harvester 822.

The operation of harvester 822 is controlled from an operator's cab 948. In the illustrated embodiment, localization input 627 (a geographic position sensor in the form of a receiver) for the reception of GPS signals (global positioning system) is attached above the operator's cab 948. A speed sensor measuring the speed of the wheels 914 may be provided. Mounted on one side of the clean grain elevator 936 is a capacitor moisture sensor 952 for measuring the moisture content of the clean grain. Such a sensor is disclosed in DE 199 34 881 A, the full disclosure of which is hereby incorporated by reference. A mass flow sensor 954 is located at the outlet of the clean grain elevator 936. The mass flow sensor 954 comprises an impact plate mounted for rotation about a horizontal axis. Its deflection is dependent upon the mass flow rate of the clean grain. The deflection of the impact plate is measured and thus data on the mass flow rate of the harvested grain is provided. Such a sensor is described in EP 0 853 234 A (the full disclosure of which is hereby incorporate by reference) and the documents recited therein.

Sensors 836 and sensors 838 are similar to sensors 636 and sensors 638, respectively, in that sensors 836, 838 comprise mechanisms to concurrently sense or detect one or more crop attribute values for multiple portions of a utilized crop harvesting width of the harvester. Said another way, each of sensors 836, 838 senses only a portion of the total crop being harvested at any moment in time by the harvester 822, wherein each of sensors 836, 838 provide crop attribute values for just that portion. In one implementation, sensors 836, 838 provide crop attribute values on a row-by-row basis. In another implementation, sensors 836, 838 provide crop attribute values on a plant-by-plant basis or based upon an aggregation of individual plants. Such crop attribute values for the individual plants do not merely comprise of data regarding the population of plants or the spacing of plants. Instead, each of sensors 836, 838 are configured to specifically sense other attributes of the individual plant such that crop attribute values pertaining to estimated mass of the grain or product of the individual plant, the estimated mass other than grain (MOG) of the plant and/or the like may be derived.

As further shown by FIG. 6, crop sensing control unit 956 is located in the operator's cab 948 or somewhere else on the harvester 822. Crop sensing control unit 956 comprises each of memory 628, processor 630 and databases 700, 702 described above with respect to FIG. 8. Crop sensing control unit 956 is in communication with localization input 627, the moisture sensor 952, the mass flow sensor 954, the speed sensor, when present, and sensors 836, 838. Crop sensing control unit 956 is provided with an internal clock or receives external time signals, for example from the input 627. Crop sensing control unit 956 records the amount of harvested grain, measured by means of the mass flow sensor 954, and its moisture content, measured by means of the moisture sensor 952, dependent on the geographical position of the harvester 822 (measured by means of the localization input 627, e.g., a GPS receiver). Crop sensing control unit 956 additionally receives signals and/or data from sensors 836 and derives one or more crop attribute values for each of multiple distinct portions of harvesting platform 916. In one implementation, crop sensing control unit 956 derives one or more crop attributes for individual rows or row units of harvesting platform 916, wherein data is processed and stored on a row-by-row basis. In another implementation, crop sensing control unit 956 derives and stores one or more crop attributes for individual plants or aggregations of individual plants. Crop sensing control unit 956 logs the data in learned database 702 and produces a field summary which may also be stored in learned database 702 and presented on output 624. In one implementation, crop sensing control unit 956 creates a yield map.

FIG. 7 schematically illustrates an example operation of sensors 836, sensors 838 and crop sensing control unit 956 (shown in FIG. 6). As shown by FIG. 7, in one implementation, sensors 836 are mounted to or within harvesting platform 916 (shown as a corn head). In one implementation, sensors 836 comprise accelerometers, strain gauge sensors and/or the like mounted to or coupled to at least one stripper plate 980 along multiple row units of harvesting platform 916. In one implementation, sensors 836 are mounted to or couple to at least one stripper plate 980 along each row unit of harvesting platform 916. Sensors 836 are in communication with processor 630 of crop sensing control unit 956 (shown in FIG. 6). In one implementation, one sensor is associated with one row unit. In other implementations, more than one sensor may be associated with one row unit. In such a case, the sensors may be of the same type sensing the same or different attributes, or of different types sensing the same or different attributes. In yet other implementations, one sensor may be associated with multiple row units.

Sensors 838 are further mounted upon harvesting platform 916 proximate to each of the row units and proximate to sensors 836. In one implementation, each row unit has a dedicated sensor 838. In yet another implementation, adjacent row units share a single sensor 838. Sensors 838 output signals in response to a different stimulus as compared to sensors 836. In the example in which sensors 836 comprise sensors coupled to stripper plate 980 us a sense a force exerted upon stripper plate 980 by ear 984, sensors 838 comprise acoustic sensors to sense a sound of the crop impacting harvesting platform 916, such as an ear of corn 984 impacting a portion of harvesting platform 916.

Figure 8:
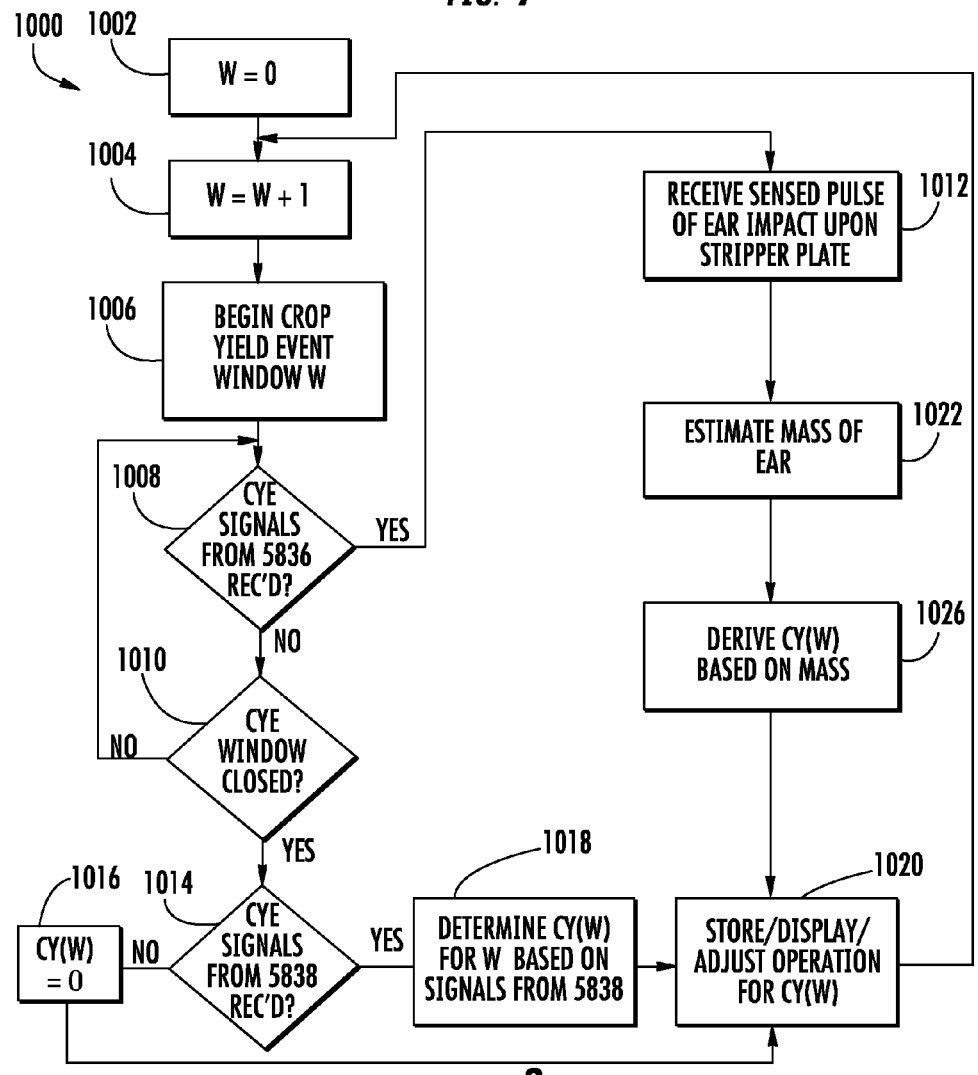
FIG. 8 is a flow diagram of another example method for estimating crop yield may be carried out by the system of FIG. 6.

FIG. 8 is a flow diagram of an example method 1000 that may be carried out by system 820 for determining crop yield based upon a combination of signals. As with method 200, method 1000 is embodied as code or circuitry in a non-transitory computer-readable medium forming memory 32. As indicated by block 1002, a crop yield event window W is initialized at a value of zero. As indicated by block 1004, the crop yield event window W is incremented by one. The variable or identifier W identifies the particular crop yield event window. This identifier may comprise any alphanumeric symbol or character for distinguishing between different windows.

As indicated by block 1006, the particular crop yield event window W begins. A crop yield event window is a predetermined period of time during which a crop yielding event is expected to take place. Such a window is defined in terms of time and/or is defined in terms of distance traveled by harvester 822. In one implementation, such a window is based upon the spacing between individual plants, such as a planting density. In one implementation, the absence of crop yielding event signals during the window may indicate a barren plant, a down, damaged or dead plant, or a missed planting.

As indicated by blocks 1008 and 1010, during each crop yield event window W for each of the portions or row units of harvester 822, processor 630 determines whether crop yielding event signals from the assigned sensor 836 have been received. In the example illustrated, processor 630 determines whether signals have been received from sensor 836 indicating a sensed pulse of an ear impacting the stripper plate. As indicated by blocks 1012, 1022 and 1026, upon receipt of such crop yielding event signals from sensor 836, processor 630 determines a crop yield CY(W) for the particular window based upon the signals from sensor 836.

Figure 11:
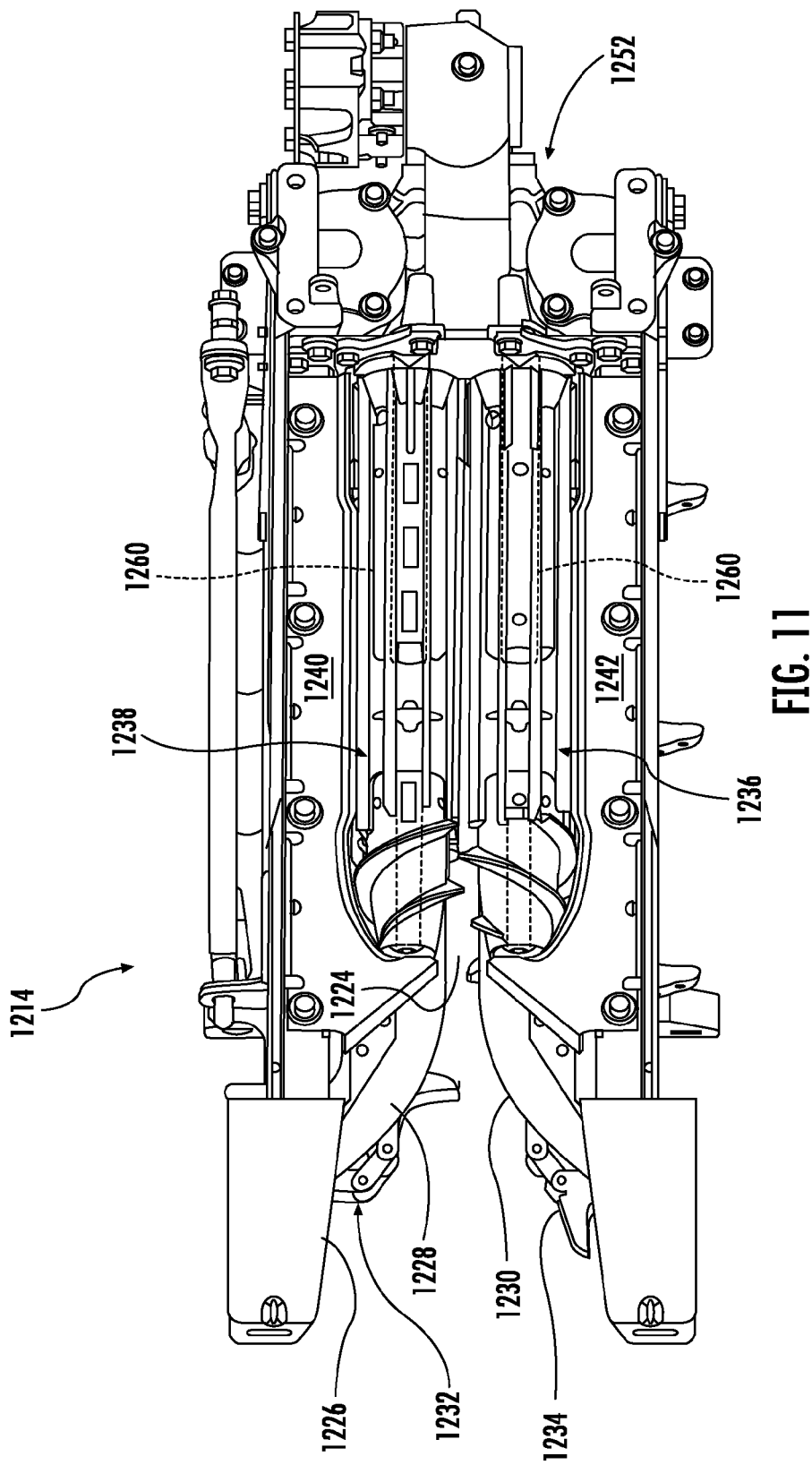
FIG. 11 is a bottom perspective view of the row unit of FIG. 10.

As indicated by block 1022, a mass of the individual ear 984 is estimated. In one implementation, processor 630 determines the crop yield CY(W) for window W based upon an estimated mass of each ear that has struck the stripper plate during window W. The mass is estimated by dividing an amplitude of the sensed pulse of the ear impacting the stripper plate by a determined velocity component of the ear. Such a velocity may be determined based at least in part upon the velocity of harvester 822 as it moves in the direction indicated by arrow 988. This velocity may be obtained from the aforementioned speed sensor or from localization input 627. In one implementation, a sensed or determined peripheral speed of snapping rollers (examples of which are shown in FIG. 11 hereafter) is also used in determining the velocity component of the ear 984.

As indicated by block 1026, processor 630 may then derive the crop attribute, such as yield, for ear 984 based upon the determined mass of ear 984. In one implementation, processor 630 may consult a lookup table, such as contained in database 700, to derive a grain yield for ear 984. Using such information, processor 630 may also determine a yield for the individual plant. Based upon the spacing in time between consecutive pulses provided by sensor 836, processor 630 may determine whether consecutive pulses are the product of two ears on a single plant or two ears on separate plants. As a result, processor 630 may determine the yield for the individual plant. Results for individual plants may be aggregated (as described above) or may not be distinguished from one another along a row to output yield on a row-by-row basis. As indicated by block 1020, the derived crop attributes, such as yield, may be stored in learned database 702 and/or may be displayed on output 624. In one implementation, processor 630 may additionally generate our output control signals adjusting the operation of harvester 822 based at least in part upon the estimated yield. Once the estimated yield has been determined, processor 630 proceeds with the next crop yield event window W through the incrementing of the window identifier W in block 1004.

As indicated by block 1014, if no crop yielding event signals are received from sensor 836 during the particular crop yield event window W for the particular portion or row unit, processor 630 determines whether crop yielding event signals have been received from the particular sensor 838 assigned to the task of monitoring the same portion or row unit during the particular window W.

As indicated by block 1016, if no crop yielding event signals have been received from sensor 838 during the particular just completed window W, processor 630 concludes that the crop yield event window W had no yield. As indicated by block 1020, processor 630 may store the zero yield for the particular window W, corresponding to a particular region of a field or row. As noted above, such zero yield may result from a barren plant, the down, dead or injured plant or a missed planting. By storing the zero yield for the particular window W, processor 630 facilitates the display, storage or presentation of maps of barren regions of a field versus productive regions of the field for use in later crop management decisions. As further indicated by block 1020, processor 630 may produce additional output based upon the detected yield for the particular region or portion of the harvester for the particular window W. For example, processing 30 may additionally display the estimated are determined yield for the window for the harvester portion as well as adjust operation of harvester 822 based upon the results.

In many circumstances, during harvest, the crop/ear of corn prematurely breaks off from the remaining portions of the stalk such that the broken off ear does not impact stripper plate 980 for the particular portion or row unit, but impacts another portion of harvesting platform 916 where it is subsequently drawn into harvester 822. Despite no signals being received from sensor 836 for the window W in which the particular plant was located, the plant being harvested during the particular crop yield event window W was indeed not barren. Sensor 838 addresses this occurrence by detecting when the prematurely broken off ear 984, corresponding to the barren crop yield event window W, has impacted another portion of harvesting platform 916. As a result, sensor 838 and the use of signals from sensor 838 improve upon the reliability and accuracy of the ongoing yield estimations by system 820.

As indicated by block 1018, if crop yielding event signals have been received from sensor 838 for the particular row unit during the just completed window W for which no signals were received from sensor 836 for the same particular row unit, processor 630 adjusts the crop yield for the particular crop yield event window W for the particular row unit. In one implementation, the receipt of signals from sensor 838 indicating impact of an ear 984 against a portion of harvesting platform 916, other than stripper plate 980, triggers adjustment of the crop yield for the particular crop yield event window W.

In one implementation, processor 630 adjusts the crop yield for the particular crop yield event window for the particular portion or row unit by a supplemental yield value of an ear. In one implementation, the supplemental yield value comprises a universal historical statistical yield for an ear over a number of years and a large growing region, such as a state, county or other multi-field region in which the crop yield event window is located. Examples of statistical values include, but are not limited to, average and median crop yield values for an individual ear 984. For example, if the field in which the crop is being harvested is located in Story County in the state of Iowa, in one implementation, processor 630 consults a lookup table or other database to retrieve a statistical value for an ear of corn over a number of years in Story County, in the state of Iowa, in the Midwest or in the nation, and utilizes the retrieved statistical value to adjust the crop yield estimate for the particular crop yield event window W for the particular row unit. In one implementation, rather than utilizing a statistical value taken over a number of years, the supplemental yield value may be a statistic taken over the most recent growing season or year or may be a statistic from the same growing season or year during which the crop is presently being harvested.

In one implementation, the supplemental yield value is a statistical yield value for the particular variety of corn being harvested over a number of years and/or over a multi-field region. In one implementation, the supplemental yield value is a statistical value over a number of years for an ear of corn from the same individual field or individual region of the field in which the crop yield event window W is located. For example, if the crop yield event window for which no crop yield event signals were received from sensor 836 occurs when harvester 822 is harvesting crops from an individual sector of a particular field, in one implementation, processor 630 consult a lookup table or other database to retrieve a statistical value for an ear of corn over a number of years for the same individual sector or for the same particular field, and utilizes the retrieved statistical value to adjust the crop yield estimate for the particular crop yield event window W for the particular row unit. In one implementation, rather than utilizing a statistical value taken over a number of years, the supplemental yield value may be a statistic taken over the most recent growing season or year or may be at the statistic from the same growing season or year during which the crop is presently being harvested.

In one implementation, the supplemental yield value is based upon the estimated yield of an ear of corn harvested during the same yield event window W, or near in time yield event window W, from one or more other portions or row units of harvesting platform 916. In one implementation, the supplemental yield value comprises an actual yield estimate value, calculated in block 1026 of method 1000, of an individual plant in another individual row unit during the same yield event window W or another near in time yield event W. In another implementation, the supplemental yield value comprises a statistical yield value for an individual ear of corn utilizing values calculated in block 1026 of method 1000 for many individual plants during the same yield event window W or near in time yield event window W across a plurality of other portions or row units of harvesting platform 916. For example, in response to processor 630 determining that a particular crop yield event window W for a particular row unit is barren, i.e. no signals received from sensor 836 for the row unit for the particular window W, and in response to receiving yield event signals during the window W from the sensor 838 assigned to the same row unit, processor 630 retrieves the yield values determined in step 1026 for adjacent row units during the same or proximate window W and utilizes a statistic of such retrieved values to adjust the yield for the barren window W.

In another implementation, the supplemental yield value comprises the estimated/calculated yield of an ear of corn harvested from the same row by the same row unit in an adjacent window W or a statistical value of the yield from many plants harvested from the same row by the same row unit in several adjacent windows W. Processing 630 adjusts the yield for the barren window W based upon the retrieved yield value, such as by utilizing the actual individual yield value calculated in block 1026 a method 1000 for another individual plant occurring in the same row unit but either preceding or proceeding the barren window W or by utilizing a statistical yield value derived from a number of individual plants harvested the same individual row unit, but preceding or proceeding the barren window W.

In yet another implementation, processor 630 determines a crop yield for the particular window W using the signals from sensor 638. In one implementation, processor 630 determines or calculate the supplemental yield value based upon one or more parameters of the signals received from sensor 638. For example, in one implementation, processor 630 may adjust the crop yield for the particular window W for the particular row unit by an amount or value based upon the decibel level of the sound as indicated from the signals from sensor 638.

As indicated by block 1020, processor 630 produces an output based upon the adjusted crop yield for the particular crop yield event window. In one implementation, processor 630 stores and/or displays the crop yield CY(W) for the particular time window, cumulative yield for the row unit, a current or cumulative yield for the harvesting platform swath and/or a cumulative yield for the field. In one implementation, processor 630 further outputs control signals adjusting the operation of harvester 822 based at least in part upon the estimated or determined crop yield CY(W) for the particular window. After such an adjustment to the crop yield for the particular crop yield event window W completed, processor 30 proceeds with the next crop yield event window W through the incrementing of the window identifier W in block 204.

Figure 9:
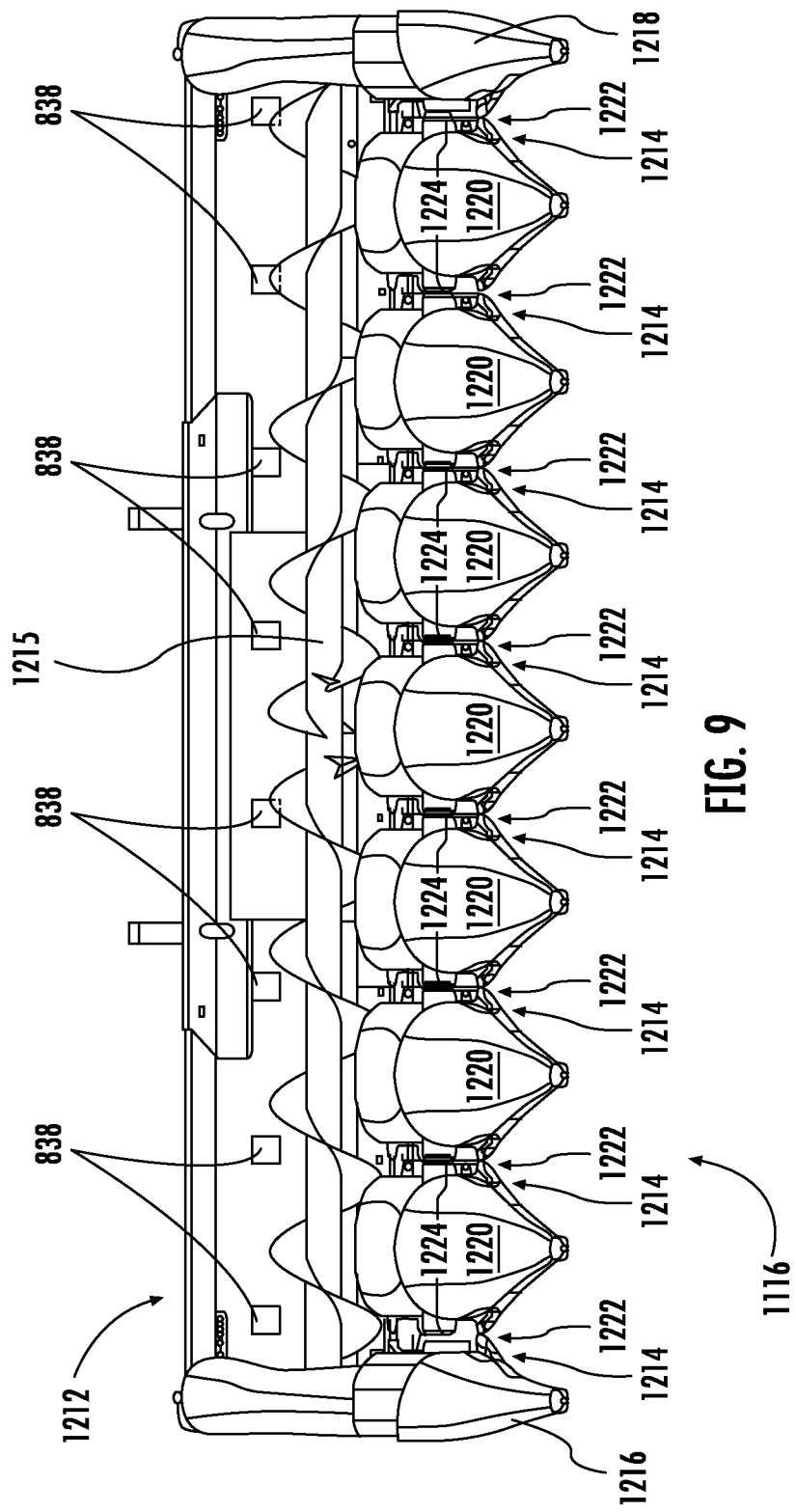
FIG. 9 is a top perspective view of an example harvesting platform for the crop yield sensing system of FIG. 6.

FIGS. 9-12 illustrate harvesting platform 1116 (shown as a corn head), an example of a portion of harvesting platform 916, and sensors 836, 838. As shown by FIG. 9, harvesting platform 1116 comprises a frame 1212, row units 1214, auger 1215, outer dividers 1216, 1218 and central dividers 1220. Frame 1212 extends across the physical width of harvesting platform 1116 and supports row units 1214. Row units 1214 harvest corn from individual rows of crop and convey the harvested corn to auger 1215 for further conveyance into harvester 1212. Row units 1214 are spaced in a side-by-side relationship with each other a distance commensurate with the spacing between adjacent rows of corn to be harvested. In some implementations, the row units 1214 may be adjustable to accommodate other corn row spacings. Outer dividers 1216, 1218 and central dividers 1220 separate co-mingled stalks of adjacent rows from one another. Central dividers 1220 extend between consecutive row units 1214. Dividers 1216, 1218 and 1220 cooperate to define longitudinal passages 1222 which are centered relative to the rows to be harvested and a fore-and-aft extending relatively narrow throat 1224 defined by each row unit 1214.

Figure 10:
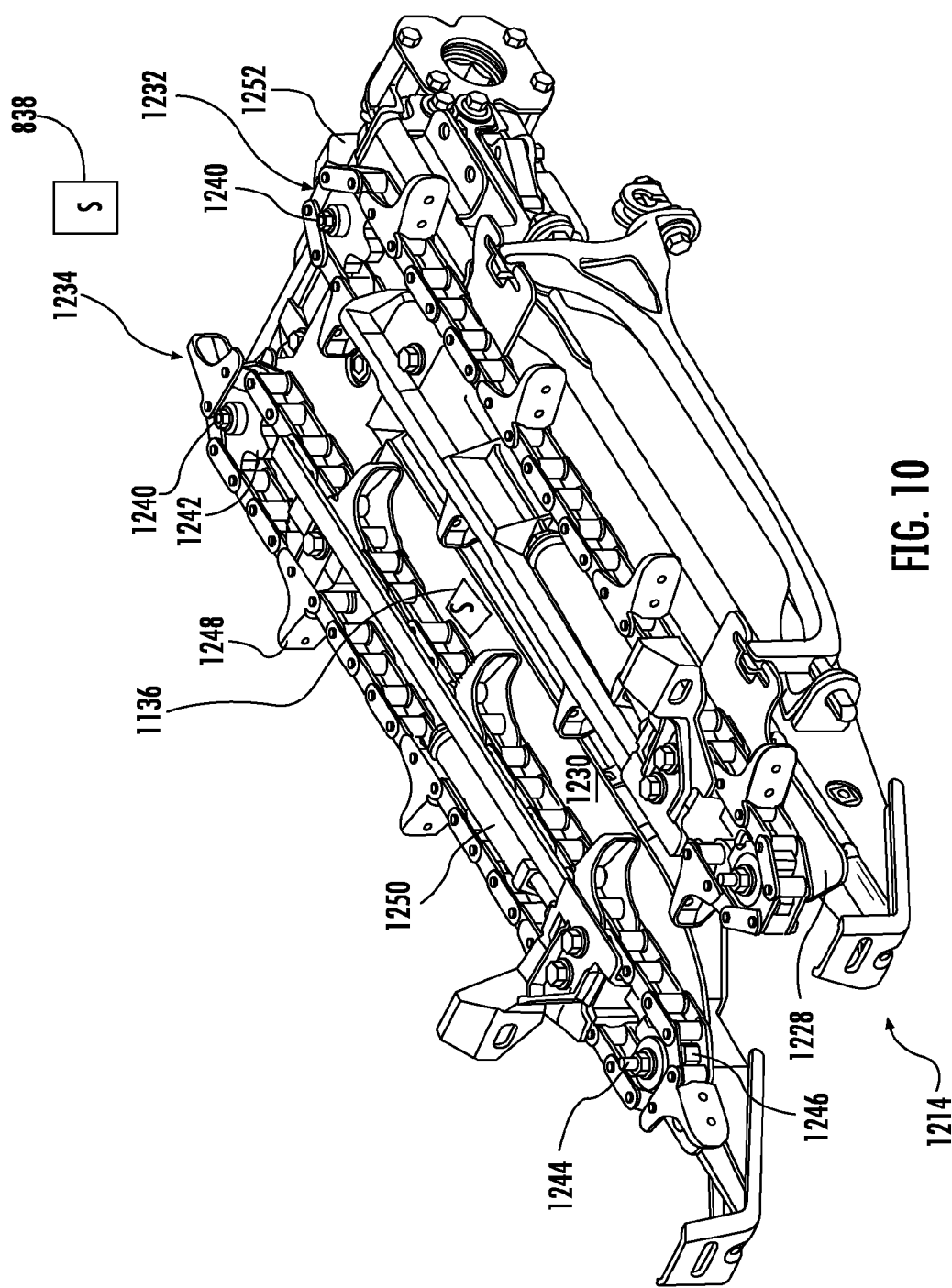
FIG. 10 is a top perspective view of an example unit of the harvesting platform of FIG. 9.
Figure 12:
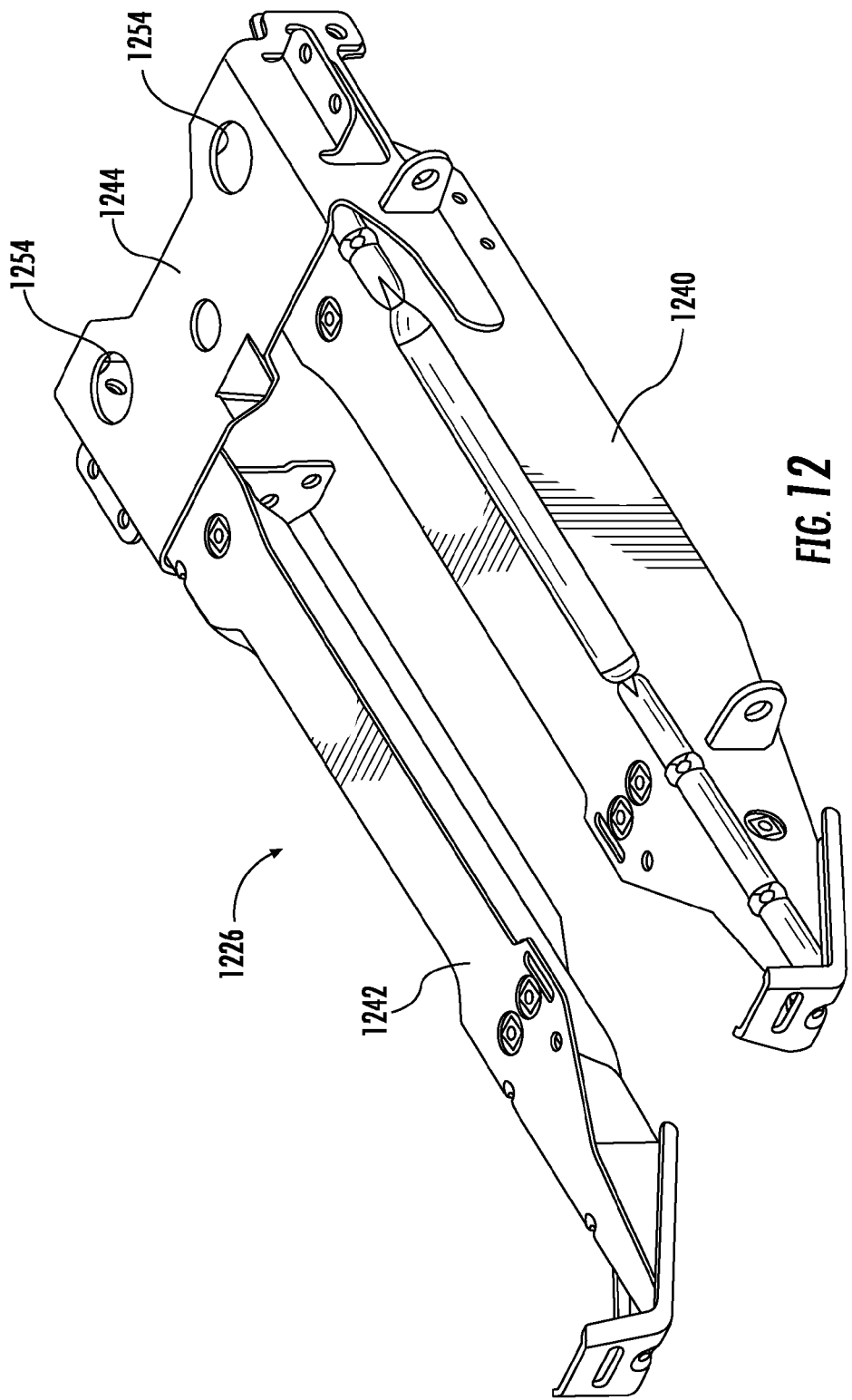
FIG. 12 is a top perspective view of an example frame of the row unit of FIGS. 9 and 10.

FIGS. 10-12 illustrate one example of a row unit 1214 in more detail. As shown by FIGS. 10-12, in addition to sensor 1136, each row unit 1214 comprises frame 1226, right and left stripper plates, also known as deck plates, 1228, 1230, right and left gathering units 1232, 1234 and snapping rolls 1236, 1238 (shown in FIG. 11). As shown by FIG. 12, frame 1226 comprise a U-shaped member having right and left, fore and aft extending legs 1240, 1242 interconnected by a transversely extending bracket or bridge 1244. Legs 1240, 1242 support stripper plates 1228, 1230 as well as right and left gathering units 1232, 1234 and snapping rolls 1236, 1238.

Stripper plates 1228, 1230 comprise plates having inner edges spaced apart so as to define narrow throat 1224. Throat 1224 receives cornstalks of an aligned row as row unit 1214 moves along a row of crops. As row unit 1214 is moved along the row, the stalks are drawn down through throat 1224 with the assistance of snapping rolls 1236, 1238 (shown in FIG. 11) such that ears of corn carried by the stalk impact the stripper plates and are separated from the stalk. Such stripper plates 1228, 1230 may include elongated openings for receiving fasteners such that stripper plates 1228, 1230 may be laterally adjusted to adjust the width or size of throat 24. As noted above, in some implementations, an actuator may be coupled to stripper plates to automatically adjust the spacing a stripper plates 1228, 1230 in response to control signals from processor 630 based upon sensor derived crop attribute values for the particular row unit 1214.

In the example illustrated, at least one sensor 1136 (schematically shown), such as an accelerometer or strain gauge is mounted to an underside of at least one of stripper plates 1228, 1230 to sense the impact of the ear of corn upon stripper plates 1228, 1230. As further shown by FIG. 10, row unit 1214 is additionally assigned sensor 838 (described above). As discussed above with respect to sensors 836, 838 and method 1000, signals produced by sensors 836 and 838 are used by processor 630 to ultimately derive a yield for a particular window of time for the particular row unit during harvesting.

Right and left gathering units 1232, 1234 gather the ears of corn and transport such ears rearwardly towards auger 1215 (shown in FIG. 9). In the example illustrated, each of gathering units 1232, 1234 comprises driveshaft 1240, drive sprocket 1242, idler shaft 1244, idler sprocket 1246, gathering chain 1248, and chain tensioning assembly 1250. Each of drive shafts 1240 extends from and is driven by a gearbox 1252 to rotationally drive sprocket 1242. Each of drive shafts 1240 extends through a corresponding opening 1254 in bight 1244 of frame 1226 (shown in FIG. 16). Drive sprockets 1242 cooperate with idler sprockets 1246 to support and drive gathering chain 1248.

Idler shafts 1244 are rotationally supported by chain tensioning assemblies 1250. Idler shafts 1244 rotationally support idler sprockets 1246. Chain tensioning assemblies 1250 adjustably support idler sprockets 1246 for movement between different fore and aft positions to adjust the tension of gathering chains 1248. Snapping rolls 1236, 1238 are mounted to a pair of drive shafts 1260 with project forwardly from gearbox 1252. As noted above, snapping rolls 1236, 1238 draw cornstalks down through throat 1224, between stripper plates 1228, 1230. Because ears of corn are too large to pass down through throat 1224, such ears impact stripper plates 1228, 1230 and are detached or severed from the stalks for being gathered by gathering chains 1248.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
    a first sensor of a first type to output first signals facilitating determination of crop yield, wherein the first sensor senses a force of impact of grain with a portion of a harvester that harvests a less than complete portion of a total harvesting swath being harvested by the harvester; and
    a second sensor of a second type different than the first type to output second signals facilitating determination of crop yield for the portion of the harvester; and
    a processing unit to receive the first signals and the second signals and determine crop yield for the portion of the harvester based on a combination of the first signals and the second signals.

2. The apparatus of claim 1 further comprising:
    a third sensor of the first type to output third signals facilitating determination of crop yield, wherein the third sensor senses a force of impact of grain with a second portion of the harvester that harvests a less than complete second portion of the total harvesting swath being harvested by the harvester; and
    a fourth sensor of the second type to output fourth signals facilitating determination of crop yield for the second portion of the harvester, wherein the processing unit is to determine crop yield for the second portion of the harvester based on the third signals and the fourth signals.

3. The apparatus of claim 1 further comprising:
    a third sensor of the first type to output third signals facilitating determination of crop yield, wherein the third sensor senses a force of impact of grain with a second portion of the harvester that harvests a less than complete second portion of the total harvesting swath being harvested by the harvester; and
    a fourth sensor of the second type to output fourth signals facilitating determination of crop yield for the second portion of the harvester, wherein the processing unit is to determine crop yield for the second portion of the harvester based upon the third signals, the fourth signals and at least one of the first signals and the second signals.

4. The apparatus of claim 1, wherein the second sensor senses noise proximate the portion of the harvester.

5. The apparatus of claim 1, wherein the portion of the harvester comprises a stripper plate, wherein the first sensor senses a force of impact of an ear of corn with the stripper plate.

6. The apparatus of claim 1, wherein the portion of the harvester comprises a stripper plate, wherein the first sensor is configured to sense a force of impact of an ear of corn with the stripper plate, wherein the second sensor is configured to sense a sound resulting from impact of an ear of corn with the harvesting head, wherein the processing unit is configured to determine the crop yield using the first signals from the first sensor and is configured to adjust the crop yield based upon the second signals from the second sensor.

7. The apparatus of claim 1, wherein the portion of the harvester comprises a stripper plate, wherein the first sensor is configured to sense a force of impact of an ear of corn with the stripper plate, wherein the second sensor is configured to sense a sound resulting from impact of an ear of corn with the harvesting head, wherein the processing unit is configured to determine the crop yield using the first signals from the first sensor and is configured to adjust the crop yield for the portion of the harvester based upon not receiving signals from the first sensor for a period of time for which signals indicating impact on an ear of corn with the stripper plate are expected and based upon receiving the second signals from the second sensor during the period time indicating impact of the ear of corn with a member of the harvester other than the stripper plate.

8. The apparatus of claim 1, wherein the processing unit is configured to determine the crop yield by:
  determining the crop yield for the portion based upon the first signals indicating a crop yielding event;
  adjusting the crop yield for the portion in response to a missing crop yielding event and the second signals indicating a second crop yielding event corresponding to the missing crop yielding event.

9. An apparatus comprising:
  a non-transitory computer-readable medium containing code to direct a processing unit to:
  receive first signals from a first sensor of a first type, wherein the first signals are from the first sensor sensing a force of impact of grain with a portion of a harvester that harvests a less than complete portion of a total harvesting swath being harvested by the harvester;
  receive second signals from a second sensor of a second type different than the first type;
  determine a crop yield for the portion of the harvester using a synergistic combination of the first signals and the second signals.

10. The apparatus of claim 9, wherein the code is to direct the processing unit to:
  receive third signals from a third sensor of the first type, wherein the third signals are from the third sensor sensing a force of impact of grain with a portion of a harvester that harvests a less than complete portion of a total harvesting swath being harvested by the harvester;
  receive fourth signals from a fourth sensor of the second type;
  determine a crop yield for the second portion of the harvester using a combination of the third signals and the fourth signals.

11. The apparatus of claim 9, wherein the code is to direct the processing unit to:
  receive third signals from a third sensor of the first type, wherein the third signals are from the third sensor sensing a force of impact of grain with a portion of a harvester that harvests a less than complete portion of a total harvesting swath being harvested by the harvester;
  receive fourth signals from a fourth sensor of the second type;
  determine a crop yield for the second portion of the harvester based upon the third signals, the fourth signals and at least one of the first signals and the second signals.

12. The apparatus of claim 9, wherein the second signals are from the second sensor sensing noise proximate the portion of the harvester.

13. The apparatus of claim 9, wherein the portion of the harvester comprises a stripper plate, wherein the first signals are from the first sensor sensing a force of impact of an ear of corn with the stripper plate.

14. The apparatus of claim 9, wherein the portion of the harvester comprises a stripper plate, wherein the first signals are from the first sensor sensing a force of impact of an ear of corn with the stripper plate, wherein the second signals are from the second sensor sensing a sound resulting from impact of an ear of corn with the harvesting head, wherein the code is configured to direct the processing to determine the crop yield using the first signals from the first sensor and to adjust the crop yield based upon the second signals from the second sensor.

15. The apparatus of claim 9, wherein the portion of the harvester comprises a stripper plate, wherein the first signals are from the first sensor sensing a force of impact of an ear of corn with the stripper plate, wherein the second signals are from the second sensor sensing a sound resulting from impact of an ear of corn with the harvesting head, wherein the code is configured to direct the processing unit to determine the crop yield using the first signals from the first sensor and to adjust the crop yield for the portion of the harvester based upon not receiving signals from the first sensor for a predefined period of time indicating impact on an ear of corn with the stripper plate and based upon receiving the second signals during the predefined period time from the second sensor indicating impact of the ear of corn with a member of the harvester other than the stripper plate.

16. The apparatus of claim 9, where the code is configured to direct the processing unit to:
  determine the crop yield for the portion based upon the first signals indicating a crop yielding event;
  adjust the crop yield for the portion in response to a missing crop yielding event and the second signals indicating a second crop yielding event corresponding to the missing crop yielding event.

17. A method comprising:
  receiving first signals from a first sensor of a first type that senses only a portion of total crop being harvested at a moment in time by a portion of a harvester;
  receiving second signals from a second sensor of a second type different than the first type, the second sensor sensing only the portion of total crop being harvested at the moment in time by the portion of the harvester;
  determining a crop yield for the portion of the harvester using a combination of the first signals and the second signals.

18. The method of claim 17, wherein the determination of the crop yield comprises:
  determining the crop yield for the portion based upon the first signals indicating a crop yielding event;
  adjusting the crop yield for the portion in response to a missing crop yielding event and the second signals indicating a second crop yielding event corresponding to the missing crop yielding event.

19. The method of claim 17, wherein the determination of the crop yield comprises:
  determining the crop yield for the portion based upon the first signals indicating impact of crop with a first portion of the harvesting head;
  adjusting the crop yield for the portion in response to a missing impact of crop with the first portion of the harvesting head and the second signals indicating an impact of crop with another portion of the harvesting head corresponding to the missing impact of the crop with the first portion of the head.

20. The method of claim 17, wherein the first signals are the result of sensing a force of impact of an ear of the crop with a portion of the harvester to produce the first signals.

* * * * *